(12) United States Patent
Gishen

(10) Patent No.: US 9,082,134 B2
(45) Date of Patent: Jul. 14, 2015

(54) DISPLAYING ADVERTISING USING TRANSIT TIME DATA

(71) Applicant: Zzzoom, LLC, Boca Raton, FL (US)

(72) Inventor: Kayle Gishen, Boca Raton, FL (US)

(73) Assignee: Zzzoom, LLC, Boca Raton, FL (US)

( * ) Notice: Subject to any disclaimer, the term of this patent is extended or adjusted under 35 U.S.C. 154(b) by 0 days.

(21) Appl. No.: 14/219,182

(22) Filed: Mar. 19, 2014

(65) Prior Publication Data

US 2014/0257949 A1 Sep. 11, 2014

Related U.S. Application Data

(63) Continuation-in-part of application No. 13/790,467, filed on Mar. 8, 2013, now Pat. No. 8,909,475, and a continuation-in-part of application No. 14/031,578, filed on Sep. 19, 2013.

(51) Int. Cl.
*G06Q 30/00* (2012.01)
*G06Q 30/02* (2012.01)

(52) U.S. Cl.
CPC ........ *G06Q 30/0252* (2013.01); *G06Q 30/0261* (2013.01); *H05K 999/00* (2013.01); *G06Q 30/0241* (2013.01); *G06Q 30/0251* (2013.01); *G06Q 30/0266* (2013.01)

(58) Field of Classification Search
CPC ............................. G06Q 30/0251; G01C 21/26
USPC ............... 701/400, 537, 538; 705/14.49, 14.5
See application file for complete search history.

(56) References Cited

U.S. PATENT DOCUMENTS

| 6,477,515 B1 | 11/2002 | Boroujerdi |
| 6,868,320 B1 | 3/2005 | Burch |
| 6,892,939 B2 | 5/2005 | Silver et al. |
| 7,840,427 B2 | 11/2010 | O'Sullivan |

(Continued)

FOREIGN PATENT DOCUMENTS

WO 2011054710 A1 5/2011

OTHER PUBLICATIONS

Crowdsourcing_wikipedia_retrieved Jul. 3, 2014.
(Continued)

*Primary Examiner* — Thomas Tarcza
*Assistant Examiner* — Tyler J Lee
(74) *Attorney, Agent, or Firm* — Fleit Gibbons Gutman Bongini & Bianco PL; Gary S. Winer; Paul D. Bianco

(57) ABSTRACT

Planning the presentation of advertisements to travelers, includes using a computer and software to receive data pertaining to a departure time, a location of one or more travelers, a starting location of the traveler, and a vendor event, including a time and location for the event. The received information is used to calculate available time between the departure time and the time of the event, and to calculate, for a given mode of travel, a travel time from the starting location to the event location and then to the departure location. The calculated travel time plus a predetermined amount of time at the event location is compared with the calculated amount of time available, and if the calculated amount of time available is at least equal, present an advertisement corresponding to the vendor event to the traveler.

20 Claims, 5 Drawing Sheets

(56) References Cited

U.S. PATENT DOCUMENTS

| | | |
|---|---|---|
| 7,844,481 B2 | 11/2010 | Hilbush et al. |
| 7,983,991 B2 | 7/2011 | Crussol |
| 8,170,790 B2 | 5/2012 | Lee |
| 8,731,835 B2 | 5/2014 | Chidlovskii |
| 8,909,475 B2 | 12/2014 | Gishen |
| 2004/0193492 A1* | 9/2004 | Applebaum ................ 705/14 |
| 2005/0091154 A1 | 4/2005 | Yokoyama et al. |
| 2007/0162761 A1 | 7/2007 | Davis et al. |
| 2007/0239348 A1* | 10/2007 | Cheung ................ 701/200 |
| 2008/0059061 A1 | 3/2008 | Lee |
| 2008/0077309 A1 | 3/2008 | Cobbold |
| 2008/0121682 A1 | 5/2008 | Grim et al. |
| 2008/0270204 A1 | 10/2008 | Poykko |
| 2009/0119001 A1 | 5/2009 | Moussaeiff |
| 2011/0022304 A1 | 1/2011 | Lee |
| 2012/0191537 A1* | 7/2012 | O'Sullivan et al. ........ 705/14.49 |
| 2012/0265578 A1 | 10/2012 | Olding et al. |
| 2012/0290652 A1 | 11/2012 | Boskovic |
| 2013/0046456 A1 | 2/2013 | Scofield |
| 2013/0095460 A1 | 4/2013 | Bishop |
| 2013/0166204 A1* | 6/2013 | Davies et al. ................ 701/533 |
| 2013/0179065 A1 | 7/2013 | Cobbold |
| 2013/0183952 A1 | 7/2013 | Davis et al. |
| 2013/0262222 A1* | 10/2013 | Gibson et al. ............. 705/14.49 |
| 2013/0297207 A1 | 11/2013 | Mason |
| 2013/0317747 A1 | 11/2013 | Chidlovskii |
| 2014/0005934 A1 | 1/2014 | Chia et al. |
| 2014/0062790 A1 | 3/2014 | Letz et al. |
| 2014/0163861 A1* | 6/2014 | Beaurepaire et al. ......... 701/400 |

OTHER PUBLICATIONS

Web-site www.shareride.com—US and Canadian Rideshare Board, © 1999-2008, 1 page—retrieved Mar. 8, 2013.
Web-site www.zimride.com—Ridesharing, Carpooling and Buses—Grab a Seat © 2013, 1 page—retrieved Mar. 8, 2013.

* cited by examiner

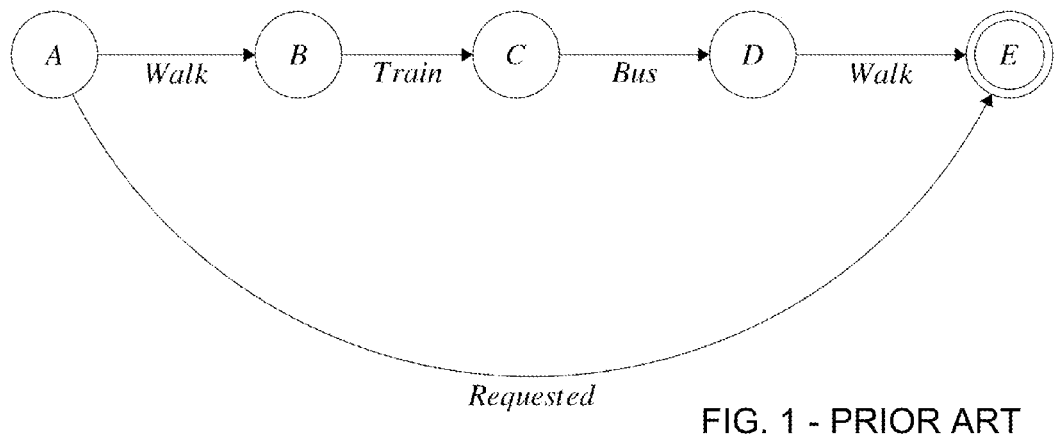
FIG. 1 - PRIOR ART
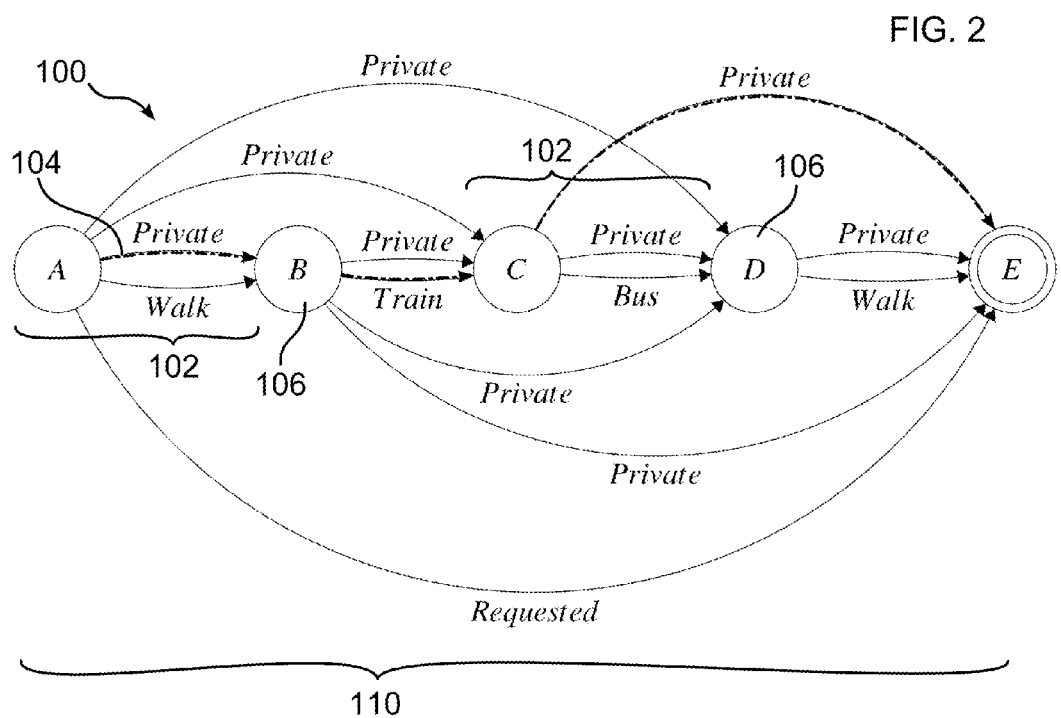
FIG. 2

DISPLAYING ADVERTISING USING TRANSIT TIME DATA

CROSS-REFERENCE TO RELATED APPLICATIONS

This application claims the benefit of, and is a continuation in part of U.S. patent application Ser. No. 13/790,467, filed Mar. 8, 2013, entitled "GENERATING TRANSPORT ROUTES USING PUBLIC AND PRIVATE MODES", and also claims the benefit of, and is a continuation in part of U.S. patent application Ser. No. 14/031,578, filed Sep. 19, 2013, entitled "SECURE DELIVERY OF PACKAGES", the contents of each of which are hereby incorporated by reference in their entirety.

FIELD OF THE DISCLOSURE

The disclosure relates to a system and method for targeted advertising, and more particularly to coordinating advertising for travelers.

BACKGROUND OF THE DISCLOSURE

To use public mass transit, such as buses, trains, planes, ferries, and the like, one consults a list of stops for each of the various modes of transport. The list may additionally provide information pertaining to the route length, the number of stops, and other details regarding the transportation mode.

To use private transport, such as walking or using a vehicle under one's control, one can use a GPS device, or consult a map to plan one's own route.

During the route, one may view advertisements displayed within a public transportation facility, including for example inside a bus or train, or within a station. Additionally, one may view or listen to an ad using a personal electronic device, for example including a smartphone or tablet. Additionally, advertisements may be visible within the environment of the route.

SUMMARY OF THE DISCLOSURE

In accordance with the disclosure, a method of planning the presentation of advertisements, comprises using at least one computer executing software stored on non-transitory media, the software configured to receive data pertaining to a departure time and location of one or more travelers; receive data pertaining to a starting location of the traveler; receive data pertaining to a vendor event, including a time and location for the event; calculate available time between the departure time and the time of the event; calculate, for a given mode of travel available to the traveler that can transport the traveler from the starting location to a location for the event, a travel time from the starting location to the event location and then to the departure location; compare the calculated travel time plus a predetermined amount of time at the event location with the calculated amount of time available, and if the calculated amount of time available is at least equal, cause presenting an advertisement corresponding to the vendor event to the traveler.

In variations thereof, the software is further configured to receive the starting location of the traveler from a mobile computing device located together with the traveler; the mobile computing device electronically determines the starting location; electronically determining the current location includes using data from at least one of a cellular network, a wired network, or a wireless network; comparing the calculated travel time includes adding an amount of time required to present the advertisement, to the calculated travel time and the predetermined amount of time, prior to comparing with the calculated time available; and/or the traveler has not reached the starting location when the advertisement is presented.

In further variations thereof, calculating a travel time includes accessing data pertaining to predetermined travel time data corresponding to at least one of the time required to travel from the starting location to the event location, and the time required to travel from the event location to the departure location; the predetermined travel time data is based upon a time when the traveler will at least one of depart the current location and depart the event location; the predetermined travel time data is based upon predetermined data associated with an isopleth; calculating a travel time includes using data associated with an isopleth.

In additional variations thereof, calculating a travel time includes comparing whether at least one of traveling from the starting location to the event location, or traveling from the event location to the departure location, and comparing the starting location or the departure location with an isoline; the event is at least one of a sale, a show, a class, a lecture; calculating a travel time includes using an average bounding circle area derived from a plurality of isochrones; calculating a travel time includes using an offset average bounding circle derived from a plurality of isochrones; calculating a travel time includes using a skewed offset bounding area derived from a plurality of isochrones.

In yet further embodiments thereof, the mode of travel is selected from the group consisting of on foot, skates, scooter, bicycle, pulled cart, electric cart, motorcycle, car, bus, boat, train, plane, and moving walkway.

In one embodiment, a computing system including the at least one computer and the software is provided.

In another embodiment of the disclosure, a method of planning the presentation of advertisements, comprises using at least one computer executing software stored on non-transitory media, the software configured to receive data pertaining to a departure time and location of one or more travelers; receive data pertaining to a starting location of the traveler; receive data pertaining to a vendor event, including a time and location for the event; receive data pertaining to isochrones associated with a geographic region including the departure and starting locations; calculate available time between the departure time and the time of the event; calculate, for a given mode of travel available to the traveler that can transport the traveler from the starting location to a location for the event, a travel time from the starting location to the event location and then to the departure location, using the isochrone data; compare the calculated travel time plus a predetermined amount of time at the event location with the calculated amount of time available, and if the calculated amount of time available is at least equal, cause presenting an advertisement corresponding to the vendor event to the traveler.

In a variation thereof, the isochrone data has the form of an isoline.

In another embodiment of the disclosure, a method of planning the presentation of advertisements, comprises using at least one computer executing software stored on non-transitory media, the software configured to receive data pertaining to a departure time and location of one or more travelers; receive data pertaining to a starting location of the traveler; receive data pertaining to a vendor event, including a time and location for the event; receive data pertaining to an isoline associated with a geographic region including the departure and starting locations; construct data representing a metaball using the isoline data; calculate available time between the departure time and the time of the event; calculate, for a given mode of travel available to the traveler that can transport the traveler from the starting location to a location for the event, a travel time from the starting location to the event location and then to the departure location, using the metaball data; compare the calculated travel time plus a predetermined amount of time at the event location with the calculated amount of time available, and if the calculated amount of time available is at least equal, cause presenting an advertisement corresponding to the vendor event to the traveler.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 1 is a graph depicting a typical public transit route of the PRIOR ART;

FIG. 2 depicts an ideal fully connected graph representing all possible routes when integrating public and private transit in accordance with the disclosure;

DETAILED DESCRIPTION OF THE DISCLOSURE

Figure 3:
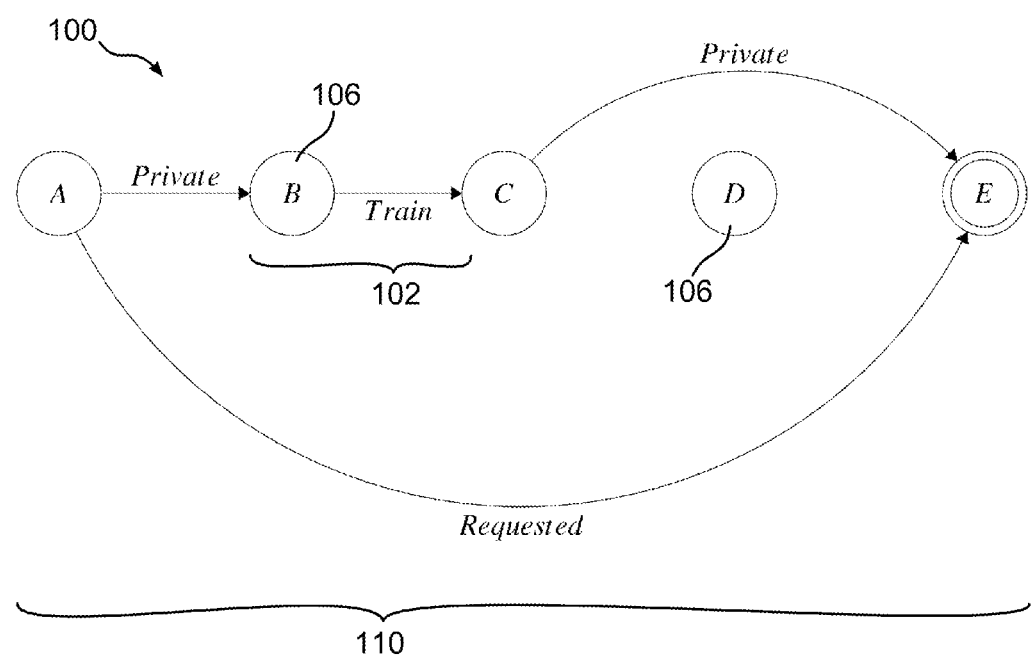
FIG. 3 depicts a least transfers route using the system of the disclosure.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Public transit includes all manner of transportation for one or more people where the people would not normally decide the route, time of departure, and many other aspects of the trip. Often, public transport is controlled by a government or quasi-government entity. Private transit includes walking and using vehicles whose departure time and route are under the control of the people traveling. Additionally, private transportation is not generally made available to all who wish to use it, whereas public transportation is generally available to all.

More specifically, private transit tends to exclude passengers who cannot afford the use or ownership of a private vehicle, particularly where the journey is far. While public transit is affordable for most passengers, the network availability, or the selection of routes and times is necessarily limited, and does not adequately provide for the needs of all who wish to travel inexpensively.

In accordance with the disclosure, public transit resources, or the public transit grid, is combined with private transportation to provide a more complete set of options for passengers wishing to obtain the flexibility of private transportation at a cost much closer to the cost of public transportation, or less than private transportation alone, particularly in consideration of the cost of ownership of a private transport vehicle.

Further in accordance with the disclosure, passengers are provided with a set of route instructions which includes information pertaining to available public transport, as well as private transport that is made available through the use of a system 100 of the disclosure. In this manner, a greater extent of route coverage is made available, as well as more flexible timing and reduced cost. Further, by making private transportation more generally available, a quasi-public transportation network is created with far greater coverage and flexibility than a conventional public transportation network.

System 100 of the disclosure creates a mixed mode transit wherein a passenger can travel using both private and public transit to achieve a better traveling experience. System 100 provides one or a plurality of routes for a passenger optimized for the least time, the least transfers, and possibly the least cost. System 100 integrated a public transit route with multiple private transit options using a graph search function of the disclosure. The search uses tiered path planning to offer routes determined to be optimal by the heuristic of the disclosure that is used to determine the optimal path.

With reference to FIG. 1, a typical prior art public transit route is represented as a graph where each node is a point along the route (A-E), the nodes are joined by connecting arrows representing various forms of travel, including 'Walk', 'Train', and 'Bus'. A travel leg 102 includes a node or waypoint 106 and an arrow extending to the next waypoint 106. A route is a series of one or more legs 102. An example route 104 is illustrated as a dashed line, in FIG. 2. A series of possible routes to a destination is a map, or result set 110.

In accordance with the disclosure, in view of a graph methodology, an original edge, corresponding to a public or private leg, is replaceable, and the graph remains monotonic, directed, and acyclic when new edges are inserted. More particularly, monotonic pertains to enforcing that the path between any two nodes is always moving the user closer to their destination. A replaceable edge is one where the filter is satisfied, and will generally be a long duration edge. A non-replaceable edge is one where a shorter duration replacement is not likely, for example a subway transfer, where the waiting time is generally short and the travel time is also short.

In accordance with the disclosure, and with reference to FIG. 2, system 100 integrates edges or legs 102, into an optimized result set 110 comprising a plurality of routes 104. A route 104 is any combination of legs 102 which advances the passenger from an origin, depicted in FIG. 2 as waypoint "A", to a destination, depicted as waypoint "E"). Legs 102 are filtered by a filter 108, based on a $\Delta_t$ and $\Delta_x$, representing a change in duration and distance, respectively, each factor limited by a threshold waiting time value. Filtering is used to foster the selection of transfers, or changes in transport mode at waypoints 106, when required, that are simple or uncomplicated for a passenger to carry out, such as a subway transfer within a city, while optimizing the route set 110 as a whole. More particularly, where a simple transfer can be used, one or more relatively more complex transfers can be discarded, reducing the size of the total set of possible legs.

It should be understood that system 100 comprises one or more computers 1000 (FIG. 4) executing software stored on non-transitory media. The calculation of routes combining all modes available, including public and private transport nodes, is understood to be impossible for humans to do in real time, as passengers stand by for an initial set of routes, or for the calculation of route changes during trips. This is particularly true for traveling in cities or between towns and cities, where there are many transport options. Further, as described in additional detail below, private transport is identified by inviting participants controlling private transportation resources to contribute those resources, for example to offer providing rides to passengers. These invitations and contributions are created using the internet, or any other computer based network, and can include using the cellular network and smartphones, in addition to other forms of computing resources. It is contemplated that system 100 performs these calculations, together with invitations for private transport, for the route planning of at least hundreds or thousands of travelers at a given time.

In the instant disclosure, a driver is a person who owns, operates, or controls a private vehicle not normally hired as a taxi or other vehicle principally hired out and licensed chiefly for this purpose. In the context of the instant application, while a driver may make money or obtain other benefits from volunteering their vehicle within system 100, it is generally considered that this is an ancillary purpose for the vehicle, and the vehicle is not principally used as a taxi, limousine, bus, or the like.

Further in accordance with the disclosure, private transportation services from drivers is crowd-sourced using an offer and bid model, in which drivers who have registered with system 100 can volunteer their services to drive passengers, and passengers can bid on the seats made available in this manner. Crowdsourcing as defined in Wikipedia is the practice of obtaining needed services, ideas, or content by soliciting contributions from a large group of people, and especially from an online community, rather than from traditional employees or suppliers. In the context of the instant disclosure, crowdsourcing specifically includes passengers and drivers using system 100 to offer or seek available seats.

Driver's engaged in the use of system 100 can accept a passenger bid if they find any or all of the following to be satisfactory: monetary compensation, departure time, seats required, length of route, passenger identity, including gender and age, and other information. In accordance with a further aspect of the disclosure, drivers are compensated with the transfer of credits purchased in whole or in part by passengers, advertisers, operators of system 100, government agencies, employers, schools, philanthropists, family members, or others. Drivers can convert credits into monetary compensation using system 100. In this manner, passengers and drivers do not need to exchange cash, or use credit cards, increasing the safety of all participants.

In one embodiment, the cost of a ride using private transport is based on its distance. As bids do not have to have the same starting and ending points as an original driver's offer, the bid price may differ from an original offer. In another embodiment, passengers submit requests for rides to system 100, and drivers bid to transport the passengers. In this embodiment, passengers search for transport to a destination using system 100, for example using a website or cellphone application embodying portions of system 100. In response, system 100 provides transport routes that include private, public, and integrated public and private results. A passenger may then make a request to system 100, using the website or application. Drivers, also using the website or application, can then submit bids to provide the private portions of the transport route.

When a passenger or driver specifies a route or destination, they include a time span when the route is needed or available, the number of seats that are needed or can be provided, and the beginning and end points desired or available, respectively. This is provided when requesting and offering a bid. When a bid is accepted, the starting and ending points of the route are assigned to the winning bidder. If the route is integrated, the bids are automatically placed for the passenger. If a bid is not accepted by any driver, a route that is entirely public is presented to the passenger.

System 100 receives continuously updated information pertaining to public routes from the public transport providers, and from private services that monitor such public routes. Because the set of all possible public transport routes within a geographic area can be vast, calculating public or integrated routes can be processor intensive and complex, and could not be carried out manually in a sufficiently timely manner to produce a timely and useable result. Further, it is challenging and expensive to carry out the calculations using computer servers in a timely and cost effective manner, as well. Accordingly, in accordance with the disclosure, to reduce processing time and costs, a subset of all public transport possibilities is used in a typical route analysis for a passenger. This subset represents known popular or reliable public routes, the size of the subset targeted to correspond to available processing power and reasonable time constraints, e.g. an amount of time that a passenger or driver will wait for a result. Private transit results may then be correlated with the selected subset by joining graphs in accordance with the disclosure. If there are many private results, these too may be limited by similar criteria, for similar reasons.

FIG. 2 illustrates a result set 110 of possible routes 104, each route 104 comprised of one or more legs 102. The result set 110 may have eliminated some non-simple transfers due to filter 108, and thus the result set does not show all theoretical routes 104. In FIG. 2, the waypoints 106, are the same as depicted in FIG. 1, but in accordance with the disclosure, each waypoint 106 in FIG. 2 is connectable by a set of a plurality of legs, the legs representing the simplest modalities from a passenger's perspective, as clarified by filter 108. FIG. 2 thus integrates a set of travel choices into a single map or result set 110, where each node is connected by at least one theoretically viable transport mode. In subsequent steps, it is determined if each mode is in fact predicted to be available at the required time. This real time availability will likely further reduce the set of available leg choices in subsequent steps.

FIG. 3 shows a possible route. The route is achieved through the use of a graph search algorithm, which can include for example A*, Dijkstra's Algorithm, and Breadth- First Search (BFS) strategies, although other strategies may be used. When searching the 'graph', (herein a map), for possible result set 110 of possible routes, the 'edges' (herein legs 102), between each 'node' (herein stops or transfers) are weighted specifically for the type of leg 102. Weighting is based on factors impacting the relative merits of each leg 102, such factors including, for example, most progress, least transfers, fastest, and least expensive. When determining the least transfers route, the BFS strategy can be used without any edge weighting, as the algorithm will naturally provide an optimal solution.

As can be seen from FIG. 3, six legs 102 of the result set 110 have been removed, leaving route 104, which has been determined to be the most direct and simple route for the passenger. In the case of fastest (least time), the weights could be the time required to complete the leg combined with the amount of time a passenger would be stationary at one point. This may be calculated in accordance with Formula 1 of the disclosure, as follows:

$$w = nt_p(+^*)(t_m)^x \text{ where } n \text{ and } x \text{ are constant, } x<1, \text{ and } t_p, t_m \text{ are time waiting and time moving, respectively.} \quad \text{Formula 1:}$$

Formula 1 emphasizes the time a passenger will be waiting, while simultaneously reducing the weight on movement time. Thus, as long as the passenger is moving, an important optimizing requirement is satisfied, however consideration must also be given to time in motion.

In accordance with an alternative embodiment of the disclosure, x can be a combination of $t_p$, $t_m$, for example tp/tm, in order to satisfy x<1, as opposed to a constant. This change causes the optimization to factor in time waiting versus time traveling, while still optimizing total time.

The foregoing weighting heuristics of the disclosure replace the distance metric generally used in A*. Since each waypoint is at a fixed coordinate, use of the standard implementation of A*, which is Manhattan or Euclidean, would result in the same result as BFS. The use of Formula 1 provides a more accurate and useful result than using Manhattan or Euclidean heuristics.

If at any point a route 104 determined using public or private transit results in a significant waiting period at a public transit node, for example the passenger arrives early with respect to a departure time, a second public transit search can be conducted, and the resultant second public transit graph is tiered, or reintegrated into a new result set of routes for the passenger. The two original public transit graphs can be isolated, yet each joined with the same or different private transit options. The routes found from the initial result set are compared with the new result set. Typically, the second result set is an improvement upon the least time route of the first result set. This tiering integration can continue until all significant pauses in movement are reduced.

Further in accordance with the disclosure, a result set 110 is provided diagrammatically, or routes 104 can be presented as a list of directions, for the passenger. The diagram and or directions enable the user to select from at least one viable route 104. In one embodiment, a passenger can customize a given route 104 by changing a leg 102, for example removing a private leg 102, resulting in presenting the one or more public transportation modes previously determined. For example, a passenger can continue to change one or more legs 102 designated private transport to public transport legs, until a completely public transit route 104 is generated. In another embodiment, a user can request that one or more public transport legs 102 of a route 104 be replaced by private transport. If no simple or efficient private transport legs 102 are available, an inefficient private transport leg 102 could then be substituted.

In accordance with the disclosure, it is thus possible to combine public transportation options which do not form a complete path between an origin and a destination, because the one or more gaps therebetween can be filled by private transport. More particularly, multiple public transit graphs are joined, and new nodes or waypoints are created where there is no overlap. These new waypoints are then connected by private transit. An example process is illustrated in Example 1, which follows.

EXAMPLE 1

Route Generation Process

A passenger seeks transportation from Palo Alto, Calif. to San Francisco, Calif. System 100 analyzes all available private offers starting in Palo Alto and ending in San Francisco, and returns these immediately to the user. The system then analyzes public transit information, generally using a subset of all possibilities that is likely to be satisfactory to a passenger, for example based upon popularity, ratings, or previous selections by this passenger or a set of passengers. Once the routes are identified, the route request input is parsed, and a graph data structure is assembled. For ease of understanding, in the following example only one public transportation route results, consisting of four legs:

1 Walk from Origin in Palo Alto to bus stop A.
2 Take bus B to train station C.
3 Take train D northbound to San Francisco station E.
4 Walk from train station E to the Destination (~10 mins).

Next, system 100 matches available offers from drivers for any of the four nodes, and finds the following result set of two offers:

1 Offer #1: From Origin in Palo Alto to train station C.
2 Offer #2: From train station C in San Francisco to the Destination (~2 mins)

These two offers are added to the graph data structure. Next, system 100 performs the graph search. Using a standard BFS approach, the least-transfers route is returned:

1 Accept Offer #1 to train station C.
2 Take train D northbound to station E.
3 Either walk or accept Offer #2—due to the nature of BFS, both satisfy the route and either can be chosen. The internal structure of the graph and the BFS algorithm will determine the outcome, which may not be the optimal result for the passenger.

Next, system 100 performs an A* graph search as modified in accordance with the disclosure. The suggested route is as follows:

1 Accept Offer #1
2 Take train D northbound
3 Accept Offer #2

Here we can see that the final leg has a deterministic outcome. Using the modified A* and a simple case where Offer #2 starts as the train arrives, consideration of the duration causes the driving in Offer #2 to be favored, as it is faster than walking.

The two integrated results are transformed back into instructions from the graph structure, with each private leg containing a reference to the public legs it replaced. In the A* case, this would be represented as follows:

1 Accept Offer #1
   or (a) Walk to bus stop A,
      (b) Take bus B to train station C
2 Take train D northbound to San Francisco station E
3 Accept Offer #2
   or (a) Walk to destination These instructions are then sent to the passenger. The passenger can then remove any of the private transit offers, resulting in the original public transit route. Once satisfied with the choices made, the user can save the route. If the route contains private transfer offers, the system then makes all needed private transit bids on behalf of the user. When it is time for the ride to commence, if a private transit bid has not been accepted, or private transfer availability has not otherwise been confirmed, the user will see the corresponding public transit results again.

In accordance with the disclosure, an optimal route satisfies both a predetermined minimum time requirement and a predetermined least transfers requirement simultaneously, or is otherwise acceptable to the passenger. System 100 attempts to find the shortest travel time which requires the least (fewest) transfers. An optimal route may not satisfy a predetermined criteria for absolute least transfers, but may be faster, or conversely may satisfy least transfers, but require a longer travel time.

In an embodiment, a passenger can use a computing device to enter a natural language request, whether typed or spoken. Natural language processing is carried out by computer 1000 using a variable context compiler 1020 (not illustrated). Compiler 1020 employs a first method which uses certain keywords and keyphrases to determine the meaning of successor text by using grammar rules which are correlated to a position of the keywords and keyphrases within the text. This first method captures specific patterns that are likely to have specific meaning based upon a specific grammatical order.

Compiler 1020 can additionally or alternatively employ a second method in which the order of keywords or keyphrases within the text is not a primary factor for interpretation. By removing a requirement for keywords and keyphrases to occupy a particular position within the text, and by interpreting phrases regardless of a specific grammatical order, a more flexible set of input text may be processed. In an embodiment, the first and second methods are combined, and the results are analyzed together using variable context compilation. This enables greater flexibility in the scope of language which can be understood by system 100.

In one embodiment, compiler 1020 uses a grammar which is more rigid than context free, but not as rigid as a context aware. This is achieved by specifying a tiered grammar that matches as specifically as possible, while simultaneously removing positional constraints. Variable context compiler 1020 parses L1 to LN grammars simultaneously. For example, the presence of a natural date (ex. Saturday) would match an L1 grammar rule to set the date. A modifier could be matched as well (ex. next); however, this would be part of an L2 grammar as the successor could be a day of the week or month. A complex match would be the LN* case. In this there may or may not be a triggering keyword at the beginning of the pattern, but there must be a capturing keyword within or at the end of the pattern. An example would be "from? STRING* to STRING*". In this case the word 'from' is optional, but the word 'to' must be present. To determine the beginning and end of the variable length ranges (STRING*) is where the elimination of the positional constraint is seen. Parser 1020 will match as much as possible, then through other rules remove overlapping and nested matches, as the tiered rules become more specific. In accordance with an embodiment, variable context compiler 1020 includes combining a sliding window filter with cascade architecture, where the cascade modifies the match instead of simple rejection testing.

The foregoing is illustrated with the following example.

EXAMPLE 2

Parsing Natural Language

The following inputs can be typed in, spoken then converted to text, or provided to a server forming a part of system 100 by any other means.

Input 1: "Palo Alto to San Francisco at 9 am"
Input 2: "leave at 9 am to San Francisco from Palo Alto"

Using a standard linear compiler, both inputs require two different sets of grammar rules, as compilation occurs in the order that terms are presented. This method is inefficient in that each possible order of terms requires a new rule. Conversely, the number of rules increases for combination of terms allowed. Exemplary rules used by a linear compiler, for these inputs, follow.

Rules for Input 1:
   START "to" END
   GARBAGE
   TIME

Rules for Input 2:
   GARBAGE
   TIME
   "to" END
   "from" START where GARBAGE is a rule stating the token can be discarded.

In accordance with the disclosure, the positional constraints are removed, and a cascade of rules is introduced. Accordingly, a single set of rules can process both inputs, as follows.

INPUT→STRING_GROUP "to" STRING_GROUP
STRING_GROUP→STRING_GROUP "from" STRING_GROUP
STRING_GROUP→STRING_GROUP+TIME
GARBAGE It may be seen that Input 1 is first parsed into two STRING_GROUP portions. The first portion is analyzed and is provisionally taken as the start. The second portion matches for a time and returns the time portion and the remaining tokens.

For Input 2, the two STRING_GROUP portions are different. The first portion contains the time and the second portion contains both a start and an end. The second rule is cross matched with the first rule, and the start is confirmed. The remaining location can then be taken as the destination.

While this example is simple, it illustrates the manner in which both inputs generate the same output using one set of rules in a cascade style compiler of the disclosure. The compiler has four rules which can be applied to a plurality of inputs, whereas a standard linear compiler needs seven rules to address the same two inputs. Further, a standard linear compiler must try both sets of rules, resulting in double the compilation processor work, whereas the compiler of the disclosure carries out a single set of rules. Moreover, for each change in input order, a standard linear compiler needs an additional set of rules, and must perform an additional compilation; however, the compiler of the disclosure remains at one set of rules, and carries out a single compilation.

Exemplary Computer System

Figure 4:
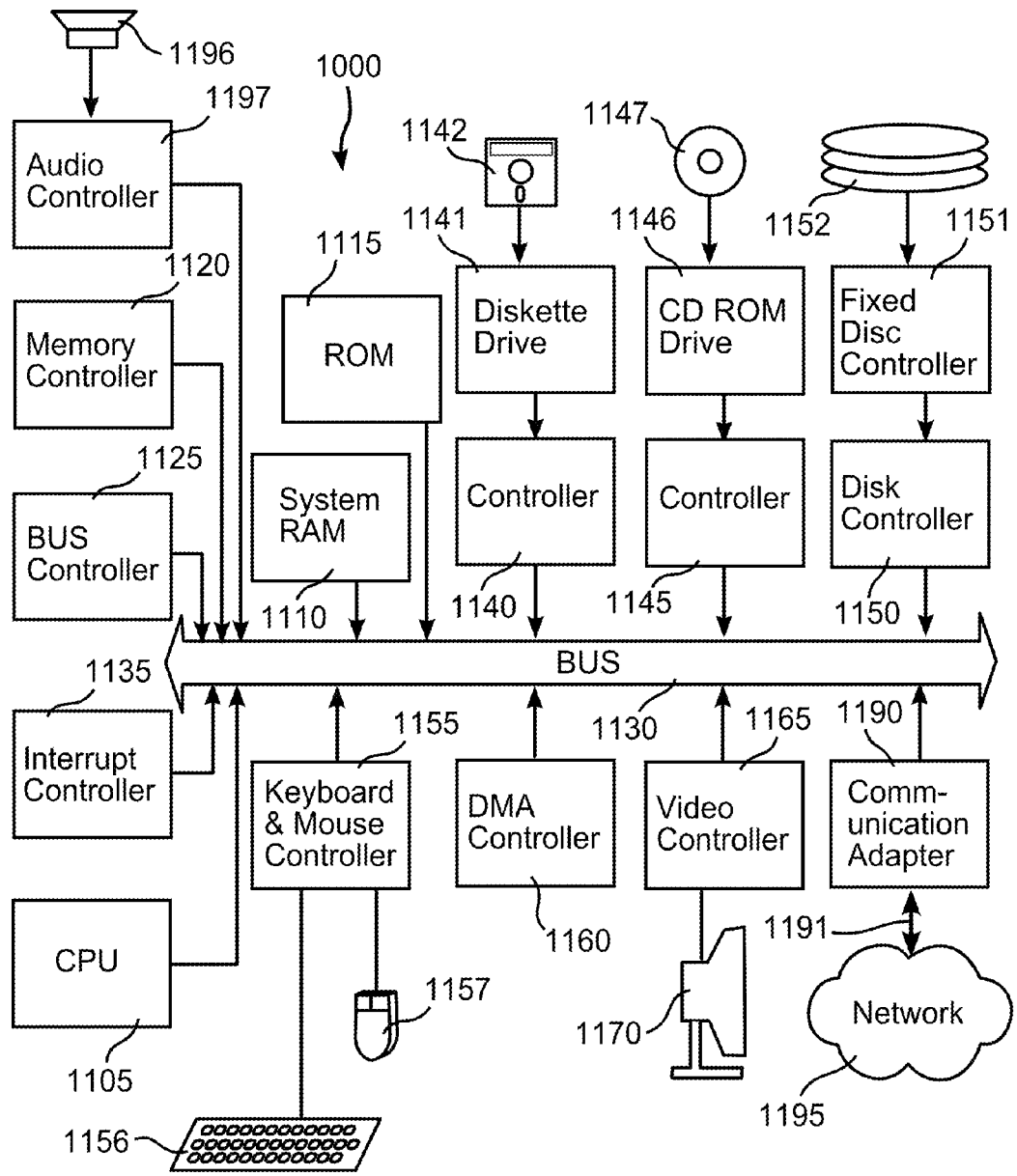
FIG. 4 depicts an illustrative computer system that may be used to carry out the disclosure.

FIG. 4 illustrates the system architecture for a computer system 1000, such as a process controller, or other processor on which or with which the disclosure may be implemented. The exemplary computer system of FIG. 4 is for descriptive purposes only. Although the description may refer to terms commonly used in describing particular computer systems, the description and concepts equally apply to other systems, including systems having architectures dissimilar to FIG. 10. Computer system 1000 can control temperatures, motors, pumps, flow rates, power supplies, ultrasonic energy power generators, and valves, using actuators and transducers. One or more sensors, not shown, provide input to computer system 1000, which executes software stored on non-volatile memory, the software configured to received inputs from sensors or from human interface devices, in calculations for controlling system 200.

Computer system 1000 includes at least one central processing unit (CPU) 1105, or server, which may be implemented with a conventional microprocessor, a random access memory (RAM) 1110 for temporary storage of information, and a read only memory (ROM) 1115 for permanent storage of information. A memory controller 1120 is provided for controlling RAM 1110.

A bus 1130 interconnects the components of computer system 1000. A bus controller 1125 is provided for controlling bus 1130. An interrupt controller 1135 is used for receiving and processing various interrupt signals from the system components.

Mass storage may be provided by diskette 1142, CD or DVD ROM 1147, flash or rotating hard disk drive 1152. Data and software, including software 400 of the disclosure, may be exchanged with computer system 1000 via removable media such as diskette 1142 and CD ROM 1147. Diskette 1142 is insertable into diskette drive 1141 which is, in turn, connected to bus 1030 by a controller 11020. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150. It should be understood that other storage, peripheral, and computer processing means may be developed in the future, which may advantageously be used with the disclosure.

User input to computer system 1000 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet, Personal Digital Assistant (PDA), mobile/cellular phone and other devices, may be connected to bus 1130 and an appropriate controller and software, as required. DMA controller 1160 is provided for performing direct memory access to RAM 1110. A visual display is generated by video controller 1165 which controls video display 1170. Computer system 1000 also includes a communications adapter 1190 which allows the system to be interconnected to a local area network (LAN) or a wide area network (WAN), schematically illustrated by bus 1191 and network 1195.

Operation of computer system 1000 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 1105 coordinates the operation of the other elements of computer system 1000. The present disclosure may be implemented with any number of commercially available operating systems.

One or more applications, such as an HTML page server, or a commercially available communication application, may execute under the control of the operating system, operable to convey information to a user.

Advertising

An advertisement within the disclosure ("ad") includes a message delivered by any medium, either free or paid, perceived by a traveler by any means, including for example visual or audible, from another entity (herein, for simplicity, a "vendor"), presented to travelers, or those contemplating travel, for some purpose, for example promoting a product, service, or cause. In accordance with the disclosure, an advertisement may correspond to an offer from a vendor which can be redeemed, exploited, or consumed (herein, "exploited") at a particular destination. The disclosure provides for selecting ads for presentation to a traveler which the traveler can reasonably exploit within their anticipated travel plans. To enable a selection, the disclosure thus further provides for forming an initial determination of an amount of time that is likely to be available to not only present the ad, but to enable the traveler to reach a destination which is the subject of the ad, and to take advantage of the offering at the destination, all within the traveler's travel plans.

Further, in all embodiments related to advertising, private/public transportation and other mixed mode or route planning methods of the disclosure can be used, and data pertaining to this routing can be used in advertising plan, as described further elsewhere herein.

While schematic maps are shown in the diagrams, it should be understood that these illustrations are provided to clarify the disclosure, and typically such information is represented solely as data within the storage or memory of one or more computers.

Figure 5:
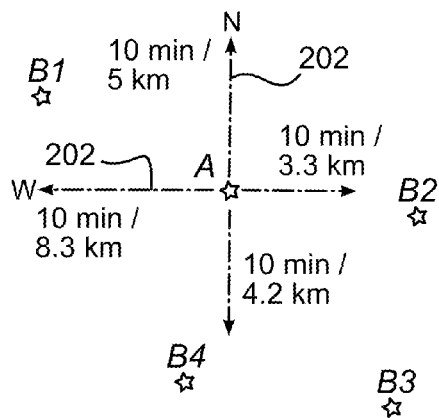
FIG. 5 depicts isochrones for an illustrative 10 minute travel interval, according to the PRIOR ART.

With reference to FIG. 5, a traveler beginning at point 'A' may elect to travel to any of a variety of destinations, here represented as 'B1'-'B4' destinations. As additionally discussed elsewhere in the disclosure, it may further be known how far a traveler can travel, using a given transportation means, within a predetermined period of time. In the example of FIG. 5, an example time of 10 minutes is illustrated, and a distance which can be attained along each of the cardinal compass points, corresponding to 3.3 km to the East, 4.2 km to the South, 8.3 km to the West, and 5 km to the North. The selection of cardinal points in this example is provided only for ease of understanding, and a lesser or greater number of different directions can be considered, as described further herein. Each of the dashed arrows or vectors 202 in FIG. 5 thus has aspects of an isochrone in that starting and ending points of each line are separated by time as opposed to distance. In the prior art, isochrones are used to determine if a destination can be reached within a particular time period. In the disclosure, isochrones are also used to determine which time periods correspond to particular destinations.

Figure 6:
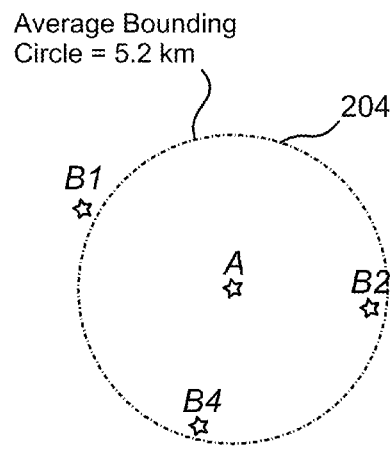
FIG. 6 depicts an average bounding circle of the disclosure, for a given 10 minute travel interval.

In some cases it may be easily understood or calculated which destinations are reachable within 10 minutes by the traveler leaving from point 'A'. However, to speed calculations, particularly for destinations which are not along a given isochrone, an average bounding circle 204 can be calculated, as shown in FIG. 6. In this example, an average of a number of isochrones available, in this case 4, correspond to a bounding circle of 5.2 km. In the example of FIG. 6, destinations B2 and B4 could be concluded to be reachable in 10 minutes, based upon the average bounding circle radius.

Figure 7:
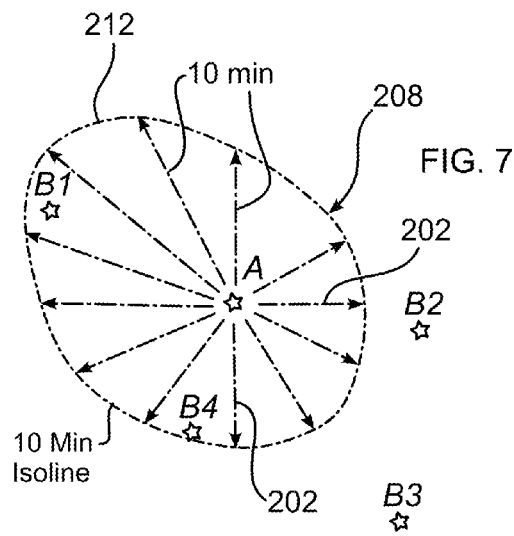
FIG. 7 depicts an isoline of the disclosure, corresponding to a plurality of isochrones representing a 10 minute travel range at a given time of day.

FIG. 7 depicts an isopleth 208, or contour region on a map, where all points within the region satisfy the requirements used to generate the region. In this disclosure, the requirements are the ability to reach any point within the bounds of the isopleth from a common starting point, within a given time period. The isopleth is defined by a plurality of vectors or isochrones 202 such as were defined with respect to FIG. 5. An isoline 212 is defined by the maximal bounding perimeter of the isopleth, such that any destination touching or within the isoline is reachable from the starting point 'A', within the given time period. As in FIG. 5, the illustrative time period is 10 minutes, however any given time period can be used, wherein all vectors 202 are indicative of the distance reachable within the given time period.

It should be understood that an isoline may enclose a different sized area, and may define a different shape, dependent upon the time of day during which the isochrones are calculated or measured. Destinations in various directions take longer to reach than others. Reasons for a change in required time relative to other isochrones of the isopleth can include population density, available traffic lanes, tolls, draw bridges, traffic density, or any other feature of the route which can reduce or increase travel time. In FIG. 7, it may be seen, for example, that location B2 takes longer to reach than destination B1, although B2 is closer to starting point 'A'.

If detailed isochrone information, such as is shown in FIG. 7 is available, accurate projections can be made in terms of travel time. However, accessing and analyzing such detailed data by computer can be computationally expensive in terms of computing resources, or in elapsed response time during planning. For example, an isopleths of a given time period could be considered to be infinitely dense, and as such, naive inclusion testing of coordinates is computationally heavy. To lighten the computational load, the isochrone data can be sampled, retrieving the maximal distance along particular direction vectors 216, as shown in FIG. 7. Accordingly, an orientation of the average bounding circle can be offset to produce offset average bounding circle 214, which better reflects or approximates detailed isochrone data, as shown in FIG. 8.

Figure 8:
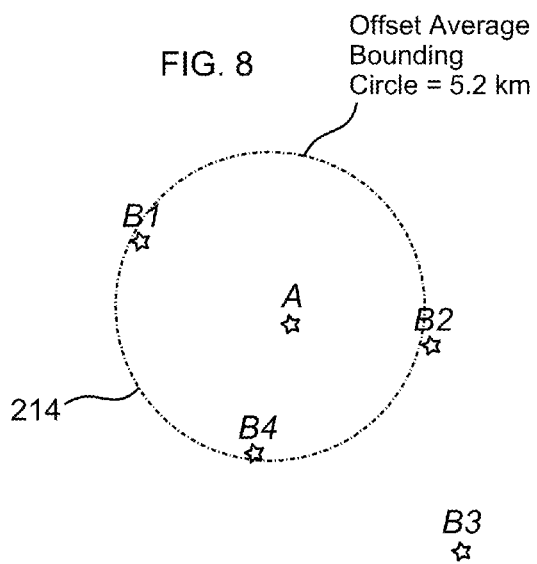
FIG. 8 depicts the average bounding circle of FIG. 6 offset using data relating to the isoline of FIG. 7.

Visually, with reference to FIG. 8, it can be seen in this example that a traveler can reach destinations to the northwest more rapidly than destinations to the southeast. A similar conclusion can be reached using computational techniques, for example to create weighted vectors, whereby the bounding circle can be offset using those vectors to better reflect the more complex pattern shown in FIG. 7. Accordingly, it may be seen, for example, that destination B2 is now correctly identified as not reachable, and destination B1 is now correctly shown as reachable.

Figure 9:
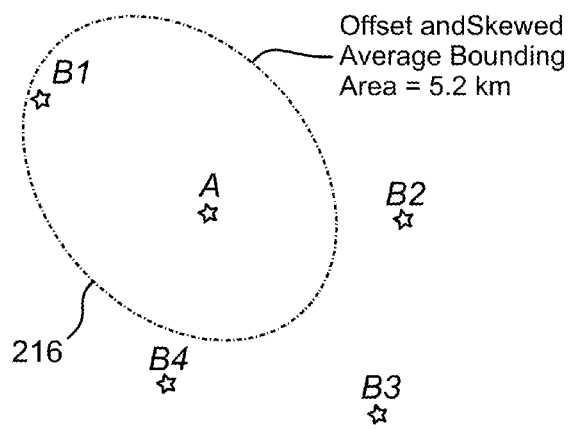
FIG. 9 depicts the average bounding circle of FIG. 8 skewed to more closely conform to the isoline data of FIG. 7.

In FIG. 9, accuracy can further be improved by skewing a shape of the bounding circle, again calculating weighting vectors, or other mathematical model, for example Marching Squares, to approximate a shape of the bounding circle to the isoline. Additionally, Convex Hull, or Concave Hull approaches can be used to approximate the bounding region using polygons. The offset and skewed bounding area 216 thus created could have the form of, for example, a two dimensional metaball. In one embodiment, the bounding shape is estimated as a polygon, after which polygon triangulation is used to break the polygon into simple triangles, which can then be used for fast inclusion testing. Thus, in accordance with the disclosure, the dense, complex data of the isoline can be converted to a corresponding geometrically regular shape using averaging, offsetting, skewing, or any combination of the foregoing, to produce a data set that can be accessed and analyzed rapidly using a computer system of one or more computers, for many active or prospective travelers, many locations, and many advertisements.

Thus, it is possible to determine with sufficient accuracy and processing speed if a destination is reachable at a given time, from a given starting location. While this is a useful result, further in accordance with the disclosure, these methods can be used to improve targeting of advertising, including selecting a suitable ad, ensuring the traveler has time to view the entire ad, and ensuring that a traveler has sufficient time after viewing the ad to exploit an offering made in the ad, as described further herein.

Figure 10:
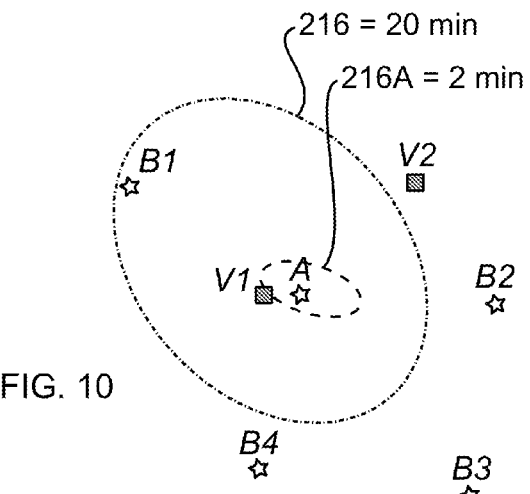
FIG. 10 depicts two average, offset, and skewed bounding areas corresponding to two destinations reachable from the same starting location.

More particularly, in FIG. 10, two vendor locations V1 and V2 are shown superimposed on the illustrative schematic map of FIG. 9. An additional bounding area 216A is shown. While bounding areas 216 and 216A are illustrated as offset and skewed average bounding area styles, it should be understood that any bounding area of the disclosure can be used, including circular, offset, areas defined by isochrones, isopleths, offset areas, and offset and skewed areas, or any combinations of the foregoing. While the time based advertising methods of the disclosure can be used with more simple polygonal and rectangular areas, error can increase if insufficient bounding points are not considered. The vendor locations V1 and V2 can correspond to advertisers who wish to reach an audience travelling nearby.

With further reference to FIG. 10, the following, at least, can be determined:

a) a traveler wishes to depart from point 'A' for destination B1, and that the trip time corresponds to the offset and skewed bounding area 216, in this example 20 minutes; and b) the traveler, departing from point 'A', can reach the vendor location V1 by walking within the time corresponding to the offset and skewed bounding area 216A, in this example 2 minutes.

For this example, it is assumed further that points 'A' and B1 correspond to train stations, and:

i) vendor V1 wishes to promote a special sale, for example at 1:00 pm; and ii) it is known or determinable that a subway will depart from point 'A' for point 'B1' at 1:20 pm.

It may be calculated that the traveler at point 'A' could reach V1 and not miss the train for B1. In this event, it may be desirable to present an advertisement for the special event, for example a sale at V1, to the traveler, who could, if so inclined, take advantage of the sale and be back in time for his trip to B1. It may also be seen, and calculated, that vendor V2 is located too far from point 'A' to enable the traveler to reach V2 without changing his travel plans. Accordingly, V2 may not wish to present an ad to the traveler, if the purpose of the ad required the traveler's/prospective traveler's presence within a short timeframe. It should be understood that a vendor location can include a location of the vendor/advertiser, or a location of a third party that an advertiser wishes the traveler to visit.

There are a variety of manners now known or which may be hereinafter invented in which the traveler's plans can be known in detail. For example, if the traveler is using a public/private transit planning system of the disclosure, the itinerary has already been analyzed by a computer system of the disclosure. If there is a private transportation vendor, that vendor has already communicated the pickup and delivery to the system, as described herein.

Alternatively, a smartphone, tablet, laptop, or other mobile computing device carried by the traveler may have been configured to allow certain location based services to access location data available from the device, indicative of a location of the device, and therefore a probable location of the user. This data may be directly or indirectly available to a system carrying out the disclosure. Location based services can include GPS, IP based, or cellular triangulation, for example. Communication of IP based or other location information can be carried out using a wired or wireless network, including BLUETOOTH, WIFI, WIMAX, a cellular network, a radio or microwave frequency based network, or any other electronic communication protocol known or hereinafter developed.

Additionally, a traveler may wish to provide location information from time to time to a system executing methods of the disclosure, using a mobile computing device. A traveler may do so in order to take advantage of sale opportunities in her area, particularly if there is waiting time until the next leg of a journey. An application executing upon the smartphone could provide an interface for sending data when desired, for example by pressing a button on a touch display of the device.

Further, a traveler's travel plans can be inferred. For example, during rush hour, it is reasonably certain there are always travelers embarking at a certain point, headed to a certain destination. Time based ads in accordance with the disclosure can thus be directed to groups, whose likely travel plans can be anticipated, it remaining relevant whether such travelers could exploit an ad within a particular time period available.

Advertisements can be presented to the traveler in a variety of ways, including presented as audio of video media upon a mobile computing device carried by the traveler, or presented upon an electronic display ad upon a building or billboard, within a building (e.g. a mall, a bus or train station, or airport), or within or upon a vehicle (e.g. a moving walkway, or a bus, train, plane, taxi, boat, etc.), including a vehicle in which the traveler is travelling. Audio ads can similarly be presented, when the traveler is within proximity of the audio transducer. Ads can be targeted to groups of individuals, where a system of the disclosure indicates there are a plurality of travelers who are in a position to exploit the ad, or who would otherwise be desirable to reach based upon their specific travel plans.

It should further be understood that an ad can be presented where it is impossible for the traveler to attend the event and resume a travel route as originally intended. For example, the traveler may elect to postpone a travel leg in order to attend an entire event at a vendor location. Accordingly, if an advertiser expects that a sufficient number of travelers may break their travel plans to attend the event, a system of the disclosure can be used to merely calculate that a traveler can arrive at a vendor location from a starting location in order to be on time for the start of the event.

Figure 11:
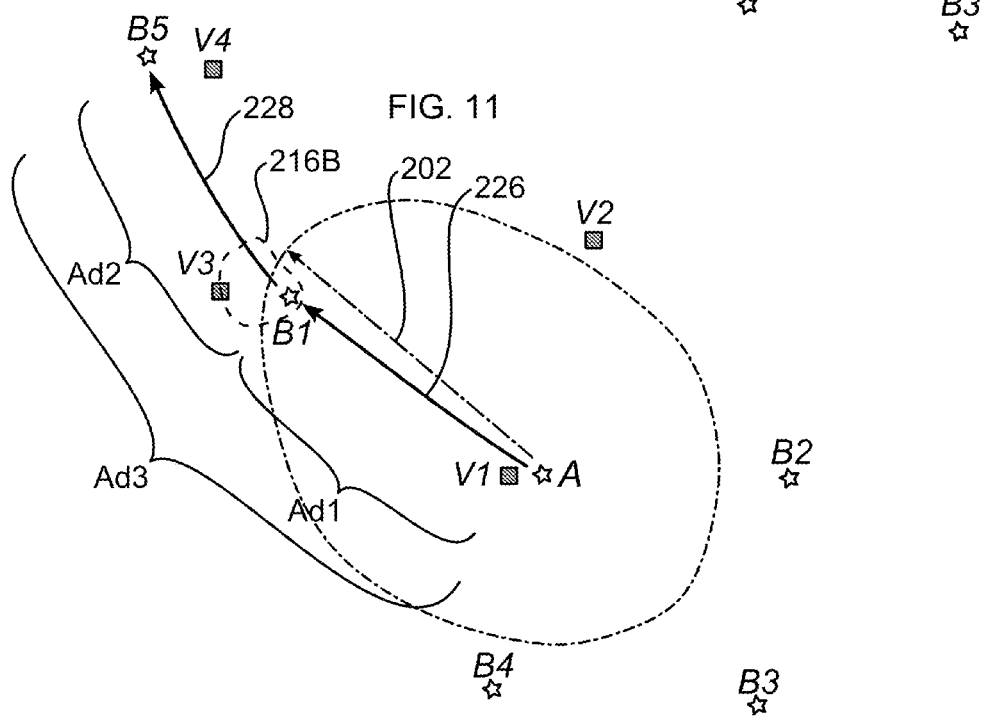
FIG. 11 depicts a route with a connection, and two bounding areas defined as isolines, illustrating various permutations of presenting advertising.

More complex models can be employed, as illustrated in FIG. 11, in which an advertisement Ad1 corresponding to vendor V3 can be presented to one or more travelers en route from point 'A' to B1, it being the intention that such travelers could visit vendor location V3 when they arrive at destination B1, and still have sufficient time to return to B1 for a connection to B5. During the trip to B5, at least some travelers who previously viewed Ad1 during transit from route A to B1 can be presented with a reinforcing or follow up advertisement Ad2. Alternatively, a single ad presented in two portions is presented in a first part during transit of a vehicle between A and B1, and a second portion during transit of a vehicle from B1 to B5.

In FIG. 11, vector 226 corresponds to the time needed to travel between point 'A' and destination B1, and vector 228 corresponds to the time needed to travel between destination B1 and destination B2. These times can be determined from available isochrones or deduced using isochrones corresponding to nearby locations, or could be obtained by looking up data corresponding to published, known, or calculated transit times of the mode of transportation the traveler is taking.

As additionally illustrated in FIG. 11, an isoline 216B is formed from isochrones data, and pertains to travel time in the area of destination B1. Accordingly, data corresponding to isoline 216B can be used to determine if a traveler departing to destination B2 has sufficient time to exploit an event at vendor location V3 prior to departure, in a manner similar to that described with respect to FIG. 7. As noted, isoline 216B can also have the forms of an average bounding circle, an offset bounding circle, an offset and skewed bounding circle. Alternatively, an isochrone can be used if it includes endpoints corresponding to B2 and V3, or data for one or more isochrones proximate B2 and V3 can be interpolated to approximate travel time between B2 and V3.

Accordingly, time travel data as described herein for the time required for a traveler to travel from point 'A' to B2, and then from B2 to V3, can be carried out using a plurality of separate isochrones based time zones, each having its own isoline, or each based upon its own approximated bounding area.

Accordingly, the disclosure provides a method of introducing time as a metric to determine the feasibility of an advertisement in location based advertising. When serving location based ads for physical entities the disclosure provides a method for adjusting the relevancy of an ad based on the user's available time to respond to the ad.

FIG. 7 illustrates 22 isochrones, the number selected to best illustrate the concept. However, it should be understood that there may be fewer or a substantially greater number of isochrones values. Where it is necessary to have time data corresponding to point along an isoline between two isochrones, for example where the sampling creates steep changes in the isoline, in accordance with the disclosure a smoothing algorithm is applied to interpolate between samples when computing the time influence. In this manner the distance difference between the normal bounding radius and how far a user can travel from their current position to the target position in the allotted time can be determined with reasonable accuracy.

Thus, isochrones data and interpolation enable a definition and formation of the bounding radius into a 2d metaball. The isoline of the meatball becomes the new bounds defined as:

$$(lat-userLat)^2+(lon-userLon)^2-timeInfluence=radius^2$$

where 'lat' is the latitude of a boundary point, 'lon' is the longitude of the boundary point, 'userLat' is the current or starting latitude of the traveler, 'userLon' is the current or starting longitude of the traveler, timeInfluence is a time factor corresponding to an influence on travel time relative an unimpeded route, and radius is the length of the resulting isochrone. For example, given a start radius of 200 m and using an isochrone having a heading of 0 degrees North and a distance of 50 m, when testing a location that has a bearing of 0 degrees North, the timeInfluence is then 50 m, yielding a total radius of 250 m; if the circle equation is satisfied, then the point is included.

It is important to note that the new bounds do not necessarily describe a bounding circle.

In a further example, given a default radius of 200 meters, a 5 minute isochrone can be applied to the center of the bounding circle. We can then know how far a user can potentially travel. It is this new potential which is used to determine the difference from our original radius and thereby to create an isoline that can be used for inclusion testing.

The bounding isoline enables the inclusion of target ads that corresponded to a vendor location that may have originally been located outside a default bounding radius. In one example, if the original bounding radius is determined through the use of walking times, the isoline will not exclude any targets within the time boundary; it can then be assumed that, over small radii, a user can walk to any point within a circle under a specified time. For example, at 2 km per hour, after 20 minutes, a user can be anywhere within a 333.33 meter radius of their start point, including its border. This analysis can be applied to other modes of transportation, but may be limited to paved or railed zones within the boundary, for example. In this instance, a combination of travel modes can be contemplated, each with its own boundary analysis. Thus, through the use of multi-modal transportation, for example including more than one mode of on foot, skates, scooter, bicycle, pulled cart, electric cart, motorcycle, car, bus, boat, train, plane, and moving walkway, or any other mode known or hereinafter invented, it is possible to greatly extend a target area.

In an alternative embodiment, instead of or in addition to sampling an original bounding isoline of an isopleth, bearing data can be computed between a current location of a traveler and the target destination. The distance between the two locations can then be referenced to the isoline by finding the point along the isoline with the same bearing and then determining which point lies nearer to a current location of the traveler.

By referencing data on how long a user will be in a target area, the disclosure enables improved advertisement relevancy. For example, if a dataset as described herein includes scheduled transportation for a traveler, this time available data can be used to compute the isochrones influencing the radius, and can also be combined with the isochrones to determine if a target is feasible. For instance, if a traveler is scheduled to leave an area in 25 minutes, it is less advantageous to present ads for a 2 hour movie that is 2 minute away, but it can be useful to promote a fast food restaurant that is 5 minutes away resulting in 20 minutes round trip travel time, leaving 5 minutes to eat. The traveling time does not need to be symmetric, as a traveler could be departing on a leg of a journey from a different position to where he is currently, and the departure coordinates can be used to determine the isopleth. It is to be understood that the use of time data in accordance with the disclosure can be used as described herein, and in combination with other methods of time computations.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A method of planning the presentation of advertisements, comprising:
    using at least one computer to execute software stored on non-transitory media, the software configured to:
        receive data pertaining to a departure time and departure location of one or more travelers;
        receive data pertaining to a starting location of the traveler;
        determine an amount of available time between a current time and the departure time;
        calculate an isoline corresponding to an area the one or more travelers could travel to from the starting location of the traveler to arrive at the departure location within the available time;
        calculate an approximating polygon area based upon the isoline;
        test for inclusion of at least one vendor location within the polygon area;
        cause presenting an advertisement, corresponding to a vendor event associated with one of the vendor locations tested to be included within the polygon area, upon at least one of a computer of the traveler, or an electronic advertising media that can be perceived by the traveler.

2. The method of claim 1, wherein the software is further configured to receive the starting location of the traveler from a computing device located together with the traveler.

3. The method of claim 1, wherein approximating a polygon area includes forming a two dimensional metaball.

4. The method of claim 1, further including planning a route for the one or more traveler from the starting location to the vendor location corresponding to the advertised vendor event.

5. The method of claim 1, wherein calculating an approximating polygon area is carried out by sampling the isoline data along particular direction vectors.

6. The method of claim 1, wherein the traveler has not reached the starting location when the advertisement is presented.

7. The method of claim 1, wherein calculating an approximating polygon area is carried out by using a Marching Squares model.

8. The method of claim 1, wherein calculating an approximating polygon area is carried out by using at least one of the Convex Hull and Concave Hull approach.

9. The method of claim 1, wherein testing for inclusion includes polygon triangulation.

10. The method of claim 1, wherein testing for inclusion includes breaking the polygon into triangles previous to a realtime requirement, wherein the triangles are used for fast time inclusion testing in realtime.

11. The method of claim 1, wherein testing for inclusion includes representing the isoline as a circle skewed by the formula $$(\text{lat}-\text{userLat})^2 + (\text{lon}-\text{userLon})^2 - \text{timeInfluence} = \text{radius}^2,$$

wherein the skewed circle is used for fast time inclusion testing in realtime.

12. The method of claim 1, wherein the event is at least one of a sale, a show, a class, a lecture, and a restaurant.

13. The method of claim 1, wherein the boundary area is a skewed offset bounding area derived from a plurality of isochrones.

14. The method of claim 1, wherein the mode of travel is selected from the group consisting of on foot, skates, scooter, bicycle, pulled cart, electric cart, motorcycle, car, bus, boat, train, plane, and moving walkway.

15. A computing system including the at least one computer and software of claim 1.

16. A method of planning the presentation of advertisements, comprising:
    using at least one computer to execute software stored on non-transitory media, the software configured to:
        receive data pertaining to a departure time and departure location for a previously planned trip of one or more travelers;
        receive data pertaining to a starting location of the traveler;
        determine an amount of available time between a current time and the departure time;
        calculate an isoline corresponding to an area the one or more travelers could travel to from the starting location of the traveler to arrive at the departure location within the available time;
        calculate an approximating polygon area based upon the isoline;
        test for inclusion of at least one vendor location within the polygon area using polygon triangulation;
        cause presenting an advertisement corresponding to a vendor event associated with one of the vendor locations tested to be included within the polygon area, upon at least one of a computer used by the traveler, or an electronic advertising media that can be perceived by the traveler while traveling.

17. A system for planning the presentation of advertisements, comprising:
    at least one computer configured to execute software stored on non-transitory media, the software configured to:
        receive data pertaining to a departure time and departure location of one or more travelers;
        receive data pertaining to a starting location of the traveler;
        calculate an isoline corresponding to an area the one or more travelers could travel to from the starting location of the traveler to arrive at the departure location within the available time;
        calculate an approximating polygon area based upon the isoline;
        test for inclusion of at least one vendor location within the polygon area;
        select and cause presenting of an advertisement corresponding to a vendor event associated with one of the vendor locations tested to be included within the polygon area, upon at least one of a computer used by the traveler, or an electronic advertising media that can be perceived by the traveler.

18. The method of claim 17, wherein testing for inclusion includes breaking the polygon area into triangles to enable fast inclusion testing.

19. The method of claim 17, wherein polygon approximation is carried out using at least one of Convex Hull and Concave Hull approaches.

20. The method of claim 17, wherein the polygon area is approximated as a skewed circle based on weighting vectors.

\* \* \* \* \*